United States Patent [19]

Leverenz

[11] 4,083,846

[45] Apr. 11, 1978

[54] PROCESS FOR THE PREPARATION OF AZO DYESTUFFS

[75] Inventor: Klaus Leverenz, Leverkusen, Germany

[73] Assignee: Bayer Aktiengesellschaft, Leverkusen, Germany

[21] Appl. No.: 674,929

[22] Filed: Apr. 8, 1976

[30] Foreign Application Priority Data

Apr. 12, 1975 Germany .............................. 2516031

[51] Int. Cl.$^2$ ...................... C09B 43/00; C09B 29/08; C09B 29/26
[52] U.S. Cl. .................... 260/207.1; 260/205; 260/206; 260/207; 260/207.5; 260/208; 260/141
[58] Field of Search ............ 260/205, 206, 207, 207.1, 260/207.5, 208, 141 P

[56] References Cited

U.S. PATENT DOCUMENTS

| 2,209,985 | 8/1970 | Lubs ..................................... 260/141 |
| 3,459,730 | 8/1969 | Schnabel et al. ..................... 260/184 |
| 3,637,651 | 1/1972 | Baron et al. .................. 260/207.1 X |
| 3,793,305 | 2/1974 | Balon ............................. 260/207.1 X |
| 3,888,841 | 6/1975 | Spietschka et al. ................. 260/141 |
| 3,962,209 | 6/1976 | Gotteschlich et al. ....... 260/207.1 X |

FOREIGN PATENT DOCUMENTS

| 2,018,473 | 5/1970 | France .................................. 260/205 |
| 2,256,171 | 6/1974 | Germany ............................. 260/184 |
| 45-40185 | 12/1970 | Japan .................................... 260/141 |

OTHER PUBLICATIONS

Wagner, et al., Synthetic Organic Chemistry, John Wiley & Sons, Inc., New York, 1953, p. 772.
Parker, "Quarterly Reviews," vol. XVI, No. 2, 1962, p. 163.

*Primary Examiner*—Charles F. Warren
*Attorney, Agent, or Firm*—Plumley and Tyner

[57] ABSTRACT

The invention relates to the preparation of azo dyestuffs which are free from sulphonic acid groups by diazotization, coupling and subsequent nucleophilic exchange of a halogen atom of the diazo component is in the o-position relative to the azo group. The process is characterized in that all the reaction steps are carried out in a neutral organic dipolar solvent, with the proviso that when using diazo components which are not diazotizable, or only incompletely diazotizable, in dilute aqueous mineral acids, the diazotization medium employed consists of aprotic solvents which do not undergo any chemical reaction with the diazonium salt of this component. The new process is distinguished by less contamination of the effluent.

10 Claims, No Drawings

PROCESS FOR THE PREPARATION OF AZO DYESTUFFS

The subject of the invention is a process for the preparation of azo dyestuffs which are free from sulphonic acid groups by diazotisation, coupling and subsequent nucleophilic exchange of a halogen atom of the diazo component which is in the o-position relative to the azo group, which is characterised in that all the reaction steps are carried out in a neutral organic dipolar solvent, with the proviso that when using diazo components which are not diazotisable, or only incompletely diazotisable, in dilute aqueous mineral acids, the diazotisation medium employed consists of aprotic solvents which do not undergo any chemical reaction with the diazonium salt of this component.

The new process is particularly suitable for the preparation of azo dyestuffs which are free from sulphonic acid groups and of which the diazo component possesses at least one cyano, nitro or sulphone group in the orthoposition relative to the azo bridge.

The procedure followed is that a diazotisable aromaticcarbocyclic or aromatic-heterocyclic amine, which has a halogen atom in the ortho-position relative to the amino group, is diazotised in one of the organic solvents defined above, the solution or dispersion of the diazonium salt is combined with the corresponding coupling component, during or after the coupling reaction the acid used in the diazotisation reaction is neutralised, and in the resulting o-halogenoazo dyestuff the o-halogen substituent or substituents is or are replaced by nitro, sulphonyl or, preferably, cyano groups, without intermediate isolation of the o-halogenoazo dyestuff.

Whilst the diazotisation of those amines which can normally be diazotised even in dilute aqueous mineral acids can be carried out in practically all customary neutral dipolar solvents, weakly basic amines, that is to say amines which are not diazotisable, or only incompletely diazotisable, in the acids mentioned, can only be diazotised in dipolar aprotic solvents which are chemically inert towards the diazonium salts produced, such as, for example, in lower aliphatic carboxylic acid nitriles, as well as in tetrahydrothiphene-1,1-dioxide and its derivatives.

Examples which may be mentioned are acetonitrile, propionitrile, β-hydroxypropionitrile, tetrahydrothiophene-1,1-dioxide, 2-methyl-, 3-methyl- and 2,5-dimethyl-tetrahydrothiophene-1,1-dioxide, unsubstituted tetrahydrothiophene-1,1-dioxide being preferred.

The suitability of a solvent can in each individual case easily be determined by a simple small-scale experiment. In this, the diazonium salt should still be detectable in the particular diazotisation batch after standing for not less than 24 hours at 0° C.

Preferably, the solvents are water-miscible. If necessary (say in order to lower the freezing point), small amounts (approx. 1 mol per mol of amine) of a lower carboxylic acid, for example formic acid or acetic acid, can be added.

The amount of solvent should be so chosen as to produce a system which can be stirred readily. In general, from 1.5 to twice the amount by weight (relative to the amine) suffices for this purpose. There are virtually no upper limits.

Suitable diazo components for the process according to the invention are, above all, 2-chloro-, 2-iodo- and especially 2-bromo-anilines which can carry further non-ionic substituents, which are customary in azo chemistry, in the benzene nucleus.

Amines which are not diazotisable in dilute aqueous mineral acids, of the formula

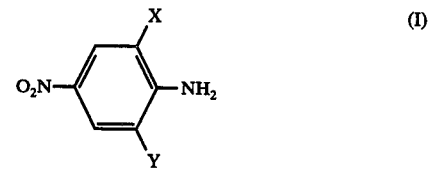

wherein

X represents Cl, Br or I (preferably Br) and

Y represents F, Cl, Br, $CF_3$, CN, $NO_2$, $COR_5$ or $SO_2R_5$ (preferably Br, $SO_2R_5$ and $NO_2$), and wherein $R_5$ denotes $C_1$–$C_4$-alkyl, cyclohexyl, phenyl, chlorophenyl, tolyl or methoxyphenyl, are particularly suitable.

Suitable diazotising agents are nitrous acid esters of aliphatic alcohols, nitrosyl chloride and above all nitrosylsulphuric acid.

The diazotisation temperatures are −20° to 30° C, preferably −10° to 10° C.

Suitable diazo components are: 2,4-dinitro-6-chloroaniline, 2,4-dinitro-6-bromo-aniline, 2,4-dinitro-6-iodoaniline, 2-brom-4-nitro-6-cyano-aniline, 2-methylsulphonyl-4-nitro-6-bromo-aniline, 2-trifluoro-4-nitro-6-bromo-aniline, 2,6-dibromo-4-nitro-aniline, and 2-chloro-6-bromo-4-nitro-aniline.

The coupling reaction can in principle be carried out in the same solvent a the diazotisation.

However, it is frequently advisable to carry out the coupling reaction in a different solvent, which is known to be more suitable for the subsequent exchange reaction, and which in most cases is also less expensive or more easily redistillable than the thiophene derivative used preferentially for the diazotisation.

Examples of such solvents are dimethylsulphoxide, N-methylpyrrolidone, tetramethylurea, ethylene glycol monoethyl ether, diethylene glycol monomethyl ether (or monoethyl ether), pyridine, N-formylmorpholine and - preferably - dimethylformamide. The coupling is in general carried out in the same temperature range as the diazotisation. Suitable coupling components are coupling components customary in disperse dyestuff chemistry, such as, for example, those of the aniline series, especially those of the general formula

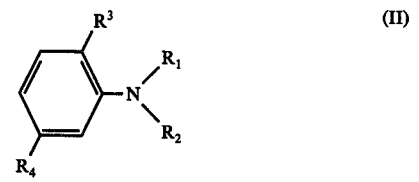

wherein $R_1$ denotes H, $C_1$–$C_4$-alkyl, $C_1$–$C_4$-alkyl monosubstituted by OH, Cl, $OCOR_5$, $OCO_2R_5$, $OCONH_2$, $OCONHR_5$, CN or $OR_5$ or phenyl-$C_1$–$C_4$-alkyl, $R_2$ denotes $R_1$, cyclohexyl or phenyl, $R_3$ denotes H, $CH_3$, $OCH_3$ or $OC_2H_5$, $R_4$ denotes H, $CH_3$, Cl, $OCH_3$, $OC_2H_5$, CN, $NHCOR_5$, $NHCO_2R_5$, $NHSO_2R_5$, $NHCONH_2$ or $NHCONHR_5$ and $R_5$ denotes $C_1$–$C_4$-alkyl, cyclohexyl, phenyl, chlorophenyl, tolyl or methoxyphenyl.

Particularly preferred coupling components of the formula II are those wherein $$R_4 = NHCOR_5 \text{ or } NHCO_2R_5.$$

Suitable coupling components are those described in DOS (German Published Specification) 1,644,177 (British Patent Specification 1,127,084), DAS (German Published Specification) 1,544,563 (British Patent Specification 1,125,683) and DAS (German Published Specification) 1,290,915 (British Patent Specification 1,125,684).

For the subsequent exchange reaction, it is advisable to neutralise the acid, originating from the diazotisation, during or after coupling. In the case of the coupling component of the formula II, with an acylamino group $R_4$, which is to be employed preferentially, neutralisation to prevent side-reactions is absolutely essential already during coupling. Organic or inorganic bases can be used for the neutralisation, such as pyridine, imidazole, triethylamine, triethanolamine, alkali metal carbonates, ammonium carbonate, alkaline earth metal carbonates and zinc carbonate, alkali metal acetates, ammonia, alkali metal hydroxides, alkaline earth metal oxides and zinc oxides, with "alkali metal" to be understood preferentially as Na and K and "alkaline earth metal" to be understood preferentially as Mg.

The exchange reactions to be carried out preferentially, namely exchanging halogen for a CN, $NO_2$ or sulphone group, are in themselves known and are described, for example, in the following patent literature: DT-OS (German Published Specification) 1,544,563 = British Patent Specification 1,125,683; DT-OS (German Published Specification) 1,809,921 = British Patent Specification 1,255,367; British Pat. Specification 1,226,950.

In carrying out this reaction stage in practice, the desired nucleophilic agent, for example metal cyanides (preferably CuCN or $Zn(CN)_2$/CuCN), metal nitrites (for example sodium nitrite, optionally in the presence of copper-I salts), or metal sulphinates (for example $NaSO_2CH_3$ or $Zn(SO_2CH_3)_2$, optionally in the presence of copper-I salts) is introduced into the previously neutralised solution or suspension of the o-halogenoazo dyestuff obtained and is allowed to act, if appropriate at elevated temperatures, until the desired exchange has been completed.

In the "cyano exchange" to be carried out preferentially, the reaction temperatures are preferably 40 to 120° C. The reaction times are from 10 minutes to 2 or 3 hours.

The metal cyanides used, such as CuCN or $Zn(CN)_2$, are preferably employed as such. However, these agents can also be produced in the reaction medium, by employing mixtures of copper-I salts or zinc salts and alkali metal cyanides. The course of the exchange reaction is suitably followed by thin layer chromatography.

It can be advantageous to effect the replacement in the presence of organic bases such as pyridine or imidazole.

The reaction products are isolated in a manner which is in itself known, for example by precipitation with water and/or methanol, oxidation of the copper-I salts (for example with iron-III chloride) if appropriate, filtration, and working up of the mother liquors by distillation.

Compared to the previous method, the new process is distinguished by less contamination of the effluent, since the solvents used can largely be recovered by distillation, with the organic and inorganic salts remaining in the distillation residue, from which they can, if appropriate, be worked up in a suitable manner.

In addition, the process according to the invention is substantially more economical than the conventional method, since at least the coupling reaction and exchange reaction, but at times also the diazotisation, can be carried out as a one-pot reaction, that is to say the costs, and apparatus, for intermediate isolation and drying of the dyestuffs prior to the exchange reaction are not involved.

From points of view of technical safety, the present process is also superior to the conventional process.

The dyestuffs prepared in accordance with the new process are in many cases known and are outstandingly suitable for dyeing synthetic fibre materials. The disperse dyestuff types to be prepared preferentially are, for example, excellent polyester dyestuffs.

EXAMPLE 1

42.7 g of 2,6-dibromo-4-nitro-aniline are suspended in 85 ml of tetrahydrothiophene-1,1-dioxide. 25 ml of 45% strength nitrosylsulphuric acid are added over the course of about 90 minutes at 10° to 15° C and the mixture is stirred for a further 90 minutes at 0° to 10° C. The resulting diazonium salt solution is added — if appropriate after clarification by filtration — at 0° to 5° C, in the course of about 60 minutes, to a mixture of 40 g of 3-(di-n-propylamino)-acetanilide, 40.7 g of zinc oxide, 2 g of urea and 150 ml of dimethylformamide (DMF). After completion of coupling, a red-brown suspension of the dyestuff of the formula

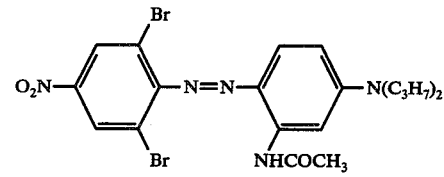

has been obtained. 9.8 g of ammonium carbonate are added and the mixture is warmed to 50° C for 30 minutes. A mixture of 17.6 g of zinc cyanide and 2.5 g of copper-I cyanide is then added and the batch is warmed to 105° C over the course of 15 minutes. After stirring for 2 hours at this temperature, the reaction has ended, according to a thin layer chromatogram. After cooling to 80° C, the dyestuff is precipitated by adding 200 ml of methanol. After completion of the crystallisation, the dark blue precipitate is filtered off and washed first with methanol, then with 10% strength hydrochloric acid and finally with water, and is dried. 44 g of the dyestuff of the formula

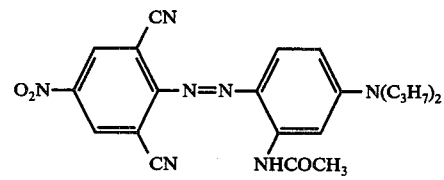

which dyes polyester in clear blue shades are obtained.

Similar results are obtained if, in this example, the DMF is replaced by 125 ml of N-methylpyrrolidone or 175 ml of dimethylsulphoxide.

EXAMPLE 2

13 g of 2,6-dibromo-4-nitro-aniline in 25 ml of tetrahydrothiophene-1,1-dioxide are diazotised with 8 ml of 45% strength nitrosylsulphuric acid over the course of 2.5 hours at 0° to 10° C.

The resulting diazonium salt solution is added at 0° to 10° C, over the course of about 15 minutes, to a mixture of 10.7 g of 3-diethylaminoacetanilide, 0.5 g of urea, 70 ml of ethylene glycol monoethyl ether, 10 ml of pyridine and 6 g of magnesium oxide. After completion of the coupling reaction, 7.8 g of copper-I cyanide are added and the mixture is heated to 120° C for 90 minutes. After adding 10 ml of pyridine, the mixture is allowed to cool and the precipitate is filtered off and rinsed first with a little ethylene glycol monoethyl ether, then with methanol and 10% strength hydrochloric acid and finally with water. 14.3 g of the dyestuff of the formula

are obtained.

EXAMPLE 3

25 ml of 45% strength nitrosylsulphuric acid are added dropwise over the course of about 90 minutes at +5° to −10° C to a suspension of 27.5 g of 2,4-dinitro-6-bromo-aniline in 85 ml of tetrahydrothiophene-1,1-dioxide and 5.5 ml of formic acid. After a further 90 minutes at −5° to 0° C, the diazonium salt solution obtained is added dropwise over the course of about 1 hour, at this temperature, to a mixture of 36.8 g of 3-diethylaminoacetanilide and 26 g of magnesium oxide in 250 ml of diemethylformamide. The dyestuff of the formula

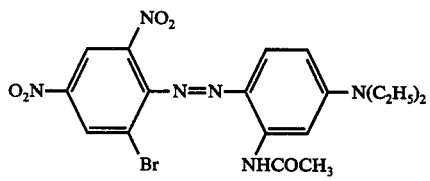

separates out immediately as a violet precipitate. After adding 8.8 g of zinc cyanide and 1.25 g of copper-I cyanide, the reaction mixture is warmed to 75° – 80° C for 30 minutes. The dyestuff formed, of the formula

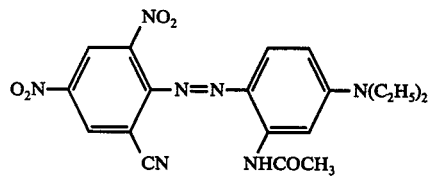

is precipitated with 400 ml of 95% strength methanol and, when it has separated out completely, is filtered off, washed with methanol, 10% strength hydrochloric acid and water and dried. Yield: approx. 46 g. (75% of theory).

37.5 g of 2,4-dinitro-6-bromo-aniline are diazotised as described above, and coupled to 36.8 g of 3-diethylaminoacetanilide. After adding 2.6 g of imidazole and 13 g of copper-I cyanide, the reaction mixture is warmed to 60° – 65° C for 45 minutes. Thereafter, 300 ml of methanol and 26 g of iron-III chloride are added. After stirring overnight, 48 g of 2-(2',4'-dinitro-6'-cyano-phenylazo)-5-diethylaminoacetanilide are isolated.

EXAMPLE 4

12.5 ml of 45% strength nitrosylsulphuric acid are added to 18 g of 6-bromo-2,4-dinitro-aniline in 100 ml of 3-hydroxypropionitrile at 0° C over the course of 2 hours, and the mixture is then stirred for a further 20 hours at −10° to 5° C.

The resulting diazonium salt solution is added dropwise at −10° to 0° C to a mixture of 18.1 g of 3-diethylaminoacetanilide, 20.4 g of zinc oxide and 100 ml of 3-hydroxypropionitrile. After stirring for two hours, 5 g of ammonium carbonate, 2.5 g of imidazole and 6.5 g of copper (I) cyanide are added to the suspension of the dyestuff obtained, and the mixture is heated to 110° C for 2 hours. After cooling, the precipitate is filtered off, washed with methanol and introduced into a solution of 13 g of iron (III) chloride and 75 ml of 30% strength hydrochloric acid in 250 ml of water in order to remove copper (I) salts. After stirring overnight, the dyestuff is filtered off, washed until neutral and dried. It corresponds to the following formula

I claim:

1. Process for the preparation of an azo dyestuff free from sulfonic acid groups comprising
   a. diazotizing an amine which is not diazotizable in dilute aqueous mineral acids of the formula:

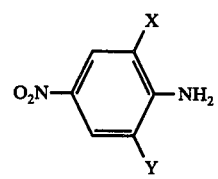

wherein
X is Cl, Br, or I; and
Y is F, Cl, Br, $CF_3$, CN, $NO_2$, $COR_6$, or $SO_2R_6$; and
wherein
$R_6$ is $C_1$–$C_4$-alkyl, cyclohexyl, phenyl, chlorophenyl, tolyl or methoxyphenyl;
in a lower aliphatic carboxylic acid nitrile or in tetrahydrothiophene-1,1-dioxide or derivative thereof;
   b. adding the resulting solution or dispersion of the diazonium salt to an aniline of the formula:

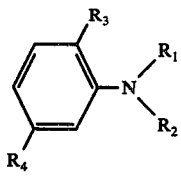

wherein
- $R_1$ is H; $C_1$-$C_4$-alkyl; $C_1$-$C_4$-alkyl monosubstituted by OH, Cl, $OCOR_5$, $OCO_2R_5$, $OCONH_2$, $OCONHR_5$, CN, or $OR_5$ or phenyl-$C_1$-$C_4$-alkyl;
- $R_2$ is $R_1$, cyclohexyl or phenyl;
- $R_3$ is H, $CH_3$, $OCH_3$ or $OC_2H_5$;
- $R_4$ is H, $CH_3$, Cl, $OCH_3$, $OC_2H_5$, CN, $NHCOR_5$, $NHCO_2R_5$, $NHSO_2R_5$, $NHCONH_2$ or $NHCONHR_5$; and
- $R_5$ is $C_1$-$C_4$-alkyl, cyclohexyl, phenyl, chlorophenyl, tolyl or methoxyphenyl in a solvent consisting essentially of a neutral organic dipolar aprotic solvent to effect a coupling reaction and form an o-halogenazodyestuff; and c. effecting a nucleophilic halogen exchange of an o-halogen atom of the resultant o-halogen azo dyestuff in the resultant reaction medium after neutralization thereof without intermediate isolation of the dyestuff.

2. Process of claim 1, wherein said amine is diazotized in tetrahydrothiophene-1,1-dioxide.

3. Process of claim 1, wherein $R_4$ is $NHCOR_5$ or $NHCO_2R_5$.

4. Process of claim 1, wherein Y is Br, $SO_2R_6$ or $NO_2$; and X is Br.

5. Process of claim 1 wherein a nitrous acid ester of an aliphatic alcohol, nitrosyl chloride or nitrosylsulphuric acid is employed as a diazotizing agent.

6. Process of claim 2, wherein nitrosylsulphuric acid is employed as a diazotizing agent, and the coupling reaction is carried out in dimethyl formamide.

7. The process of claim 1, wherein the nucleophilic halogen exchange comprises replacement of an o-halogen substituent of the diazo component with a nitro, sulfonyl, or cyano group.

8. The process of claim 1, wherein $R_4$ is $NHCOR_5$ or $NHCO_2R_5$ and wherein the reaction medium is neutralized during the coupling reaction.

9. Process of claim 7, wherein the reaction medium containing the resultant o-halogen azo dyestuff is neutralized, and nucleophilic exchange agent comprising a metal cyanide, a metal nitrite or a metal sulfinate is introduced into the neutralized reaction medium to effect the nucleophilic halogen exchange.

10. Process of claim 9, wherein the nucleophilic exchange agent is CuCN.

* * * * *